Dec. 30, 1941.                R. M. REEVES                2,268,128
                          BLACK SAND CONCENTRATOR
                           Filed Sept. 17, 1938           2 Sheets-Sheet 1
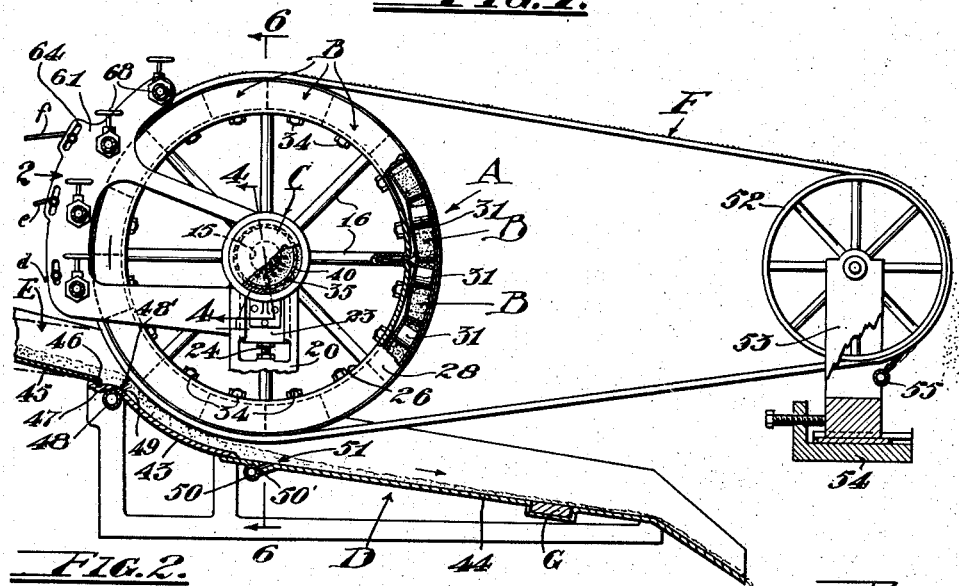
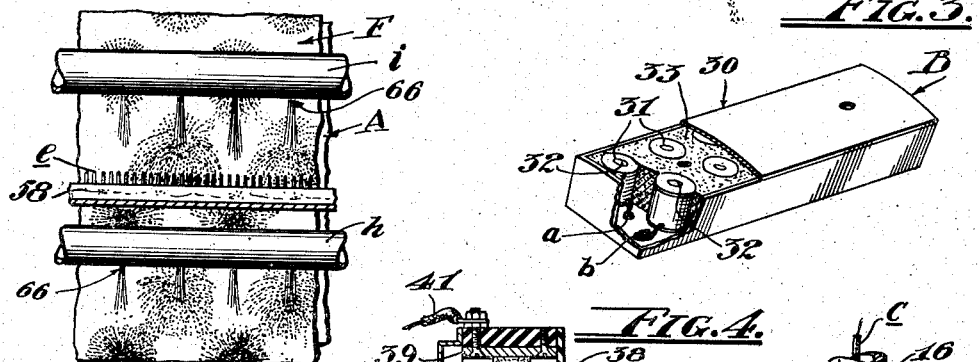
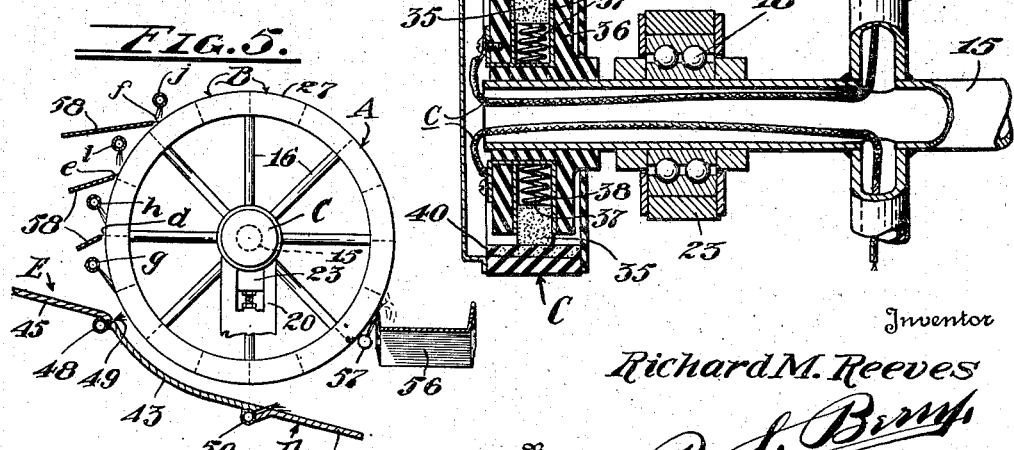
Inventor
Richard M. Reeves
By R. S. Berry
Attorney Dec. 30, 1941.  R. M. REEVES  2,268,128
BLACK SAND CONCENTRATOR
Filed Sept. 17, 1938   2 Sheets-Sheet 2
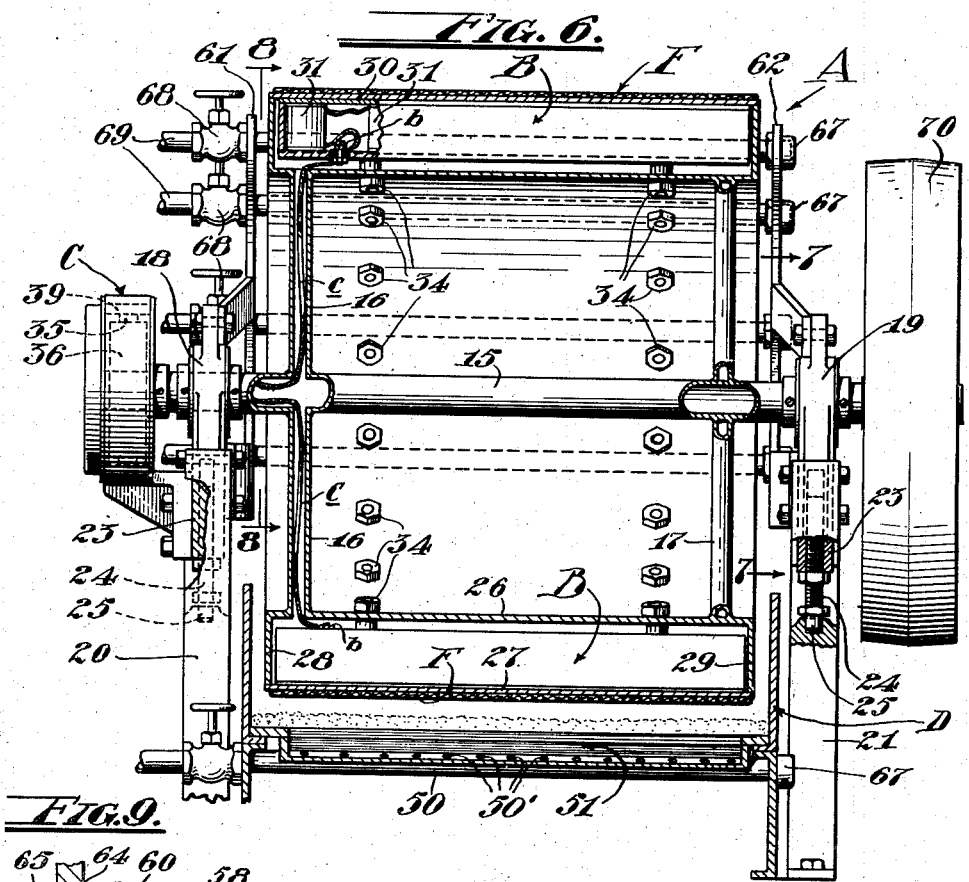
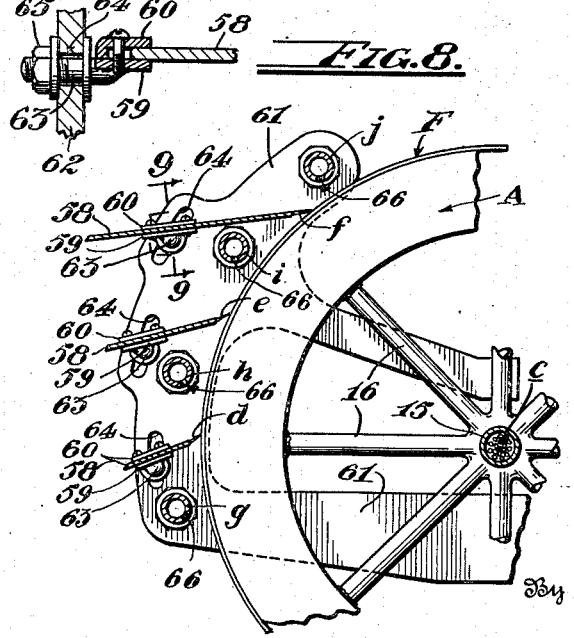
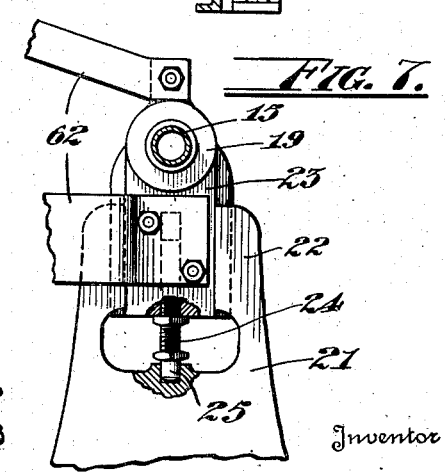
Inventor
Richard M. Reeves
By R. S. Berry
Attorney Patented Dec. 30, 1941

2,268,128

UNITED STATES PATENT OFFICE 2,268,128

BLACK SAND CONCENTRATOR

Richard M. Reeves, South Gate, Calif., assignor of one-half to James L. King, South Gate, Calif.

Application September 17, 1938, Serial No. 230,435

3 Claims. (Cl. 209—219)

This invention relates to a concentrator and more particularly pertains to concentrators of the type in which the separation of particles of gold and other valuable metals from black sands is effected by magnetic action.

An object of the invention is to provide a concentrator for working black sands containing fine particles of precious metals, which is so constructed and operated as to effect removal of magnetically attractable materials from the sands and thereby greatly reduce the volume and weight of the concentrates from which the values are to be subsequently recovered, and whereby cost of transportation and treatment of the concentrates is greatly reduced.

Another object is to provide a construction in the concentrator whereby magnetically influenced materials may be readily separated from a mass under treatment, and also to provide means for effecting recovery of such particles of values as may become associated with the magnetically separated materials.

Another object is to provide a magnetically operated separator embodying an effective regulatable means for scattering bunched magnetically attracted materials while under the influence of magnetic attraction in a series of successive actions to insure practically complete liberation and recovery from such materials of non-magnetic solid particles incorporated with the attracted materials.

Another object is to provide a concentrator of the above character which when in operation may be continuous in its action and in a fashion to permit the continuous feed thereto of the black sand to be treated and the continuous separation of magnetically influenced metallic particles from fines not subject to magnetic attraction, and whereby the valuable metals contained in the black sand under treatment may be rapidly and economically recovered.

Another object is to provide a concentrator embodying a revoluble cylinder carrying a plurality of groups of magnets on the periphery thereof, together with means for effectively delivering materials to be concentrated to a portion of the periphery of the cylinder, and in which means are provided for effecting alternate energization and de-energization of the groups of magnets at timed intervals in such fashion as to effect attraction of magnetically influenced particles from the materials under treatment to cause such attracted materials to be carried forward around said cylinder under the attraction of said magnets, and on de-energization of the magnets be directed to a suitable point of discharge.

Another object is to provide a means whereby granular materials being concentrated may be forcibly directed in a separated condition from a mass thereof towards the magnets on the cylinder.

Another object is to provide a construction whereby the groups of magnets may be readily assembled on the cylinder and removed and replaced as occasion may require.

With the foregoing objects in view, together with such other objects and advantages as may subsequently appear, the invention is carried into effect as illustrated by way of example in the accompanying drawings, in which:

Fig. 1 is a view of one form of the concentrator as seen in side elevation partly in section and with portions broken away;

Fig. 2 is a fragmentary detail in elevation as seen in the direction indicated by the arrow 2 in Fig. 1;

Fig. 3 is a perspective view of one of the magnet units with portions broken away;

Fig. 4 is an enlarged detail in section as seen on the line 4—4 of Fig. 1 in the direction indicated by the arrows;

Fig. 5 is a view in side elevation, partly in section, of a modified form of the invention;

Fig. 6 is a view in vertical section, partly in elevation, taken on the line 6—6 of Fig. 1;

Fig. 7 is a view in section and elevation as seen on the line 7—7 of Fig. 6 in the direction indicated by the arrows;

Fig. 8 is a view in section and elevation taken on the line 8—8 of Fig. 6; and

Fig. 9 is a detail in section taken on the line 9—9 of Fig. 8.

Referring to the drawings more specifically, A indicates generally a revoluble cylinder which is carried on a horizontal shaft 15 by means of sets of spokes 16 and 17 leading from the shaft 15 to adjacent the ends of the cylinder. The shaft 15 is journaled in bearings 18 and 19 mounted for vertical adjustment on supporting frames 20 and 21 arranged adjacent the ends of the cylinder A, each of which frames is fitted at its upper end with a guide way 22 in which is slidably supported a block 23 carrying one of the shaft bearings. A threaded stem 24 is screwed into the lower end of each of the blocks 23 and projects downwardly therefrom with its lower end seated in a socket 25 in the contiguous supporting frame; rotation of which stems 24 effects vertical adjustment of the blocks 24 and their associated bearings and the shaft 15.

The cylinder A embodies an inner wall portion 26 to which the spokes 16—17 are attached, and also embodies an outer wall portion 27 spaced from the wall portion 26 and detachably secured to outwardly projecting end flanges 28 and 29 on the wall portion 26. Arranged in the space between the wall portions 26 and 27 is a series of magnetic units B, each of which comprises an enclosed housing 30 containing a group of electromagnets 31 as shown in Fig. 3; each unit B embodying a plurality of rows of magnets 31 with the magnets in adjacent rows off-set in relation to each other and with the rows of magnets in each unit B arranged to extend transversely of the cylinder A. The cores 32 of the magnets 31 are presented toward the outer wall portion 27 of the cylinder A in close proximity thereto which wall portion is formed of brass or other non-magnetic material. The magnets 31 are imbedded in a suitable waterproofing compound 33 in the housings, and the units B are detachably mounted on the inner wall portion 26 of the cylinder A as by means of bolts 34.

The magnets 31 in each unit B are preferably electrically connected in series with the magnets at one end of the unit having their windings connected with binding posts $a$ and $b$, one of which is grounded on the cylinders and the other of which is adapted to be engaged with an electrical conductor $c$ leading to a suitable source of electrical current supply through the spokes 16 and shaft 15 which are hollow to afford conduits for the conductors $c$.

Means are provided for directing electrical current through the coils of the magnets 31 to effect energization of the latter, and which is adapted to effect successive de-energization of the groups of magnets as the units are advanced by rotation of the cylinder A, which means is here shown as embodying a series of electrically conductive wipers 35 projecting radially from an insulated hub 36 affixed to the outer ends of the shaft 15; the wipers 35 being pressed outwardly under the urge of springs 37 arranged in electrically conductive sockets 38 carried by the hubs 36 and to which sockets the conductors $c$ are connected. As here shown a pair of magnet units B is arranged on opposite sides of the outer end portion of the spokes 16 and connects with a pair of the conductors $c$ which lead to a pair of adjacent wipers 35. In this fashion each wiper 35 serves to control the supply of electrical current to each group of the magnets in a unit B.

The wipers 35 bear against the inner periphery of a distributor ring C enclosed in a housing D carried on the frame 20 and which distributor ring C is provided with an arcuate electrical contact plate 39 extending throughout substantially one-half the inner periphery of the distributor, the other half of the inner periphery of which distributor is formed of a non-conductive section 40. The contact plate 39 is connected to one of the other conductors 41 of an electrical circuit, the other conductor of which is grounded on a suitable portion of the machine in electrical conductive relation to the ground terminals $a$ of the magnet units B. The distributor ring C is so arranged that electrical current will be supplied to the magnets on the ascending half of the rotating cylinder A to effect energization of the magnets during this portion of their travel with the cylinder, while the current will be cut off from the magnets as they advance over the upper portion of their path of travel and move downwardly, so as to effect de-energization of the magnets during this portion of their path of travel.

Arranged beneath the cylinder A in slightly spaced relation thereto is an inclined chute D having an arcuate bottom wall portion 43 spaced a slight distance from the lower portion of the outer periphery of the cylinder A and leading upwardly from a point adjacent the plane of the vertical axis of the cylinder in the direction of rotation of the latter and terminating at a point approximately forty-five degrees from its lower end. The chute D has a bottom wall portion 44 leading at a downward incline from the lower end of the arcuate portion 43 and which portion of the chute leads to any suitable point of discharge.

Connecting with the upper end of the arcuate portion 43 of the chute is a feed trough E having an inclined bottom wall 45 formed with a downturned end portion 46 seating in a transverse channel 47 at the upper end of the chute D; the feed trough E being adapted to be swung to various positions around the pivotal support afforded by the downturned end 46 to vary the inclination thereof and accordingly vary the rate of flow of materials delivered from the feed trough to the chute D. The materials to be treated comprise granular solids suspended in water and are caused to flow by gravity beneath the lower portion of the cylinder A and in close proximity to the magnets on the latter.

Arranged beneath the upper end portion of the chute D is a water feed pipe 48 which extends transversely of the chute adjacent the lower end of the feed trough E and which pipe 48 is formed with a series of apertures 48' constituting spray nozzles which open upwardly through a slot 49 in the curved bottom wall 43 of the trough whereby jets of water under pressure may be directed upwardly through the flowing stream of materials entering the passage formed between the cylinder A and the upper end portion of the chute D so as to forcibly project solids contained in the stream of materials under treatment toward the periphery of the cylinder A such as to facilitate attraction by the magnets 31 of magnetically influenced particles of the sands.

As a means for hastening the flow of materials along the chute D and facilitate their discharge from the passage between the cylinder and the bottom wall of the chute D a water feed pipe 50 extends across the under side of the chute adjacent the lower end of the curved bottom wall 43 thereof, which pipe is formed with a series of apertures 50' constituting discharge nozzles that open to an upwardly and forwardly extending slot 51 in the bottom wall of the chute D through which a stream of water may be forcibly directed to augment the flow of material along the chute D.

In the form of the invention shown in Fig. 1 a conveyor belt F is passed around the cylinder A and leads therefrom in a general horizontal direction and passes around a wheel 52 journaled on a support 53 adjustably mounted on a bed 54 and which belt is designed to receive and to carry magnetically attracted particles imposed on the belt by the magnets 31 and to deliver such particles to discharge over the wheel 52. A spray nozzle 55 is arranged adjacent the lower portion of the wheel 52 to direct jets of water forcibly against the approaching belt in a fashion to wash the latter free of the solid particles clinging thereto.

In the form of the invention shown in Fig. 5 the belt F is dispensed with in which instance the magnetically separated materials are deposited on and carried directly on the outer wall portion 27 of the cylinder A and are deposited by the latter in a chute or conveyor 56 extending transversely of the lower portion of the cylinder. A nozzle 57 is arranged to direct jets of water against the periphery of the cylinder A counter to the direction of rotation thereof and adjacent the conveyor 56 to wash the cylinder of particles tending to cling thereto.

An important feature of the invention resides in the provision of a means for effecting scattering and washing of the materials collected by the magnets and deposited on the belt F or cylinder A and while such materials are under the influence of the energized magnets.

This means is here shown as embodying a series of brushes here shown as three in number and indicated at d, e and f and which brushes extend transversely of the cylinder A in spaced relation to each other at points to contact either the outer periphery of the cylinder or the belt F such as to brush and scatter the bunches of granular material held in place by the influence of the magnets 31 and while such materials are being advanced upwardly by the revolving cylinder A.

As here shown each of the brushes d, e and f is mounted on the edge of a plate 58 extending tangentially relative to the outer periphery of the cylinder; each plate being adjustably mounted on a pair of supporting brackets 59 by clamps 60 so that the plates may be adjusted laterally to position the brushes thereon in proper relation to the cylinder A. The brackets 59 are carried on supporting plates 61 and 62 connected with the blocks 23; each of the brackets being carried at its ends on bolts 63 extending through elongated slots 64 in the supporting plates 61 and 62; the bolts being fitted with nuts 65 whereby the bolts and brackets may be clamped in any desired position lengthwise of the slots 64. The slot extending in the general direction of the circumference of the cylinder A so that the plate and brush associated therewith may be shifted to various positions along the periphery of the cylinder. The bolts 63 are also turnable in the slots 64 so that the plates 58 may be adjusted to various angular relations to the periphery of the cylinder.

A series of spray nozzles g, h, i and j are arranged contiguous the brushes d, e and f which nozzles comprise lengths of pipe carried by the plates 61 and 62 arranged to extend transversely of the periphery of the cylinder A in close proximity thereto adjacent the brushes; each of the pipes being formed with a series of discharge apertures 66 arranged to direct jets of water toward the periphery of the cylinder A. Each of the pipes is closed at one end by a cap 67 and connects with a regulating valve 68 at its other end to which is applied a feed pipe 69 leading from any suitable source of water supply under pressure. The pipes or nozzles are turnable on the usual screw connection with the valves 68 so as to vary the angle of incidence of the jets of water discharged through the apertures 66 relative to the periphery of the cylinder A. By this arrangement of adjustably supported nozzles and of adjustable brushes adjacent to them, the water can be sprayed upon the granules of ore simultaneously with their being acted upon by said brushes, thus very efficiently ridding the ascending stream of ore of its non-magnetizable portion, which portion will be washed by the water flowing from the nozzles back along the ascending portion of the belt and in part over the brushes back into the trough E.

Located in the bottom wall of the chute D at a suitable point below the accelerating nozzle 50 is a magnetic unit G similar in construction to the unit B over which the valuable concentrates flow and which magnetic unit serves as a collector of such particles of magnetic iron and the like as may have escaped separation from the values by the magnets on the cylinder A. A pulley wheel 70 is mounted on the shaft 15 for connection with a driving mechanism by which the cylinder A may be rotated, but manifestly any suitable driving mechanism may be employed.

In the operation of the invention the cylinder A as viewed in Figs. 1 and 5, is rotated in a clockwise direction, and the materials to be concentrated and separated are fed in a screened granular form together with a volume of water through the feed trough E to the upper end of the chute D, and are thus directed downwardly beneath the revolving cylinder A counter to the direction of rotation of the latter. During this rotation of the cylinder electrical current is directed from the distributor C to the groups of magnets in the units B as the latter pass along the under side of the cylinder A and move upwardly therewith; the current being thus supplied to the magnets until the units are carried over the upper part of the cylinder A thereby maintaining the magnets energized throughout their upward travel. Energization of the magnets acts to attract magnetic particles of the sands passing beneath the cylinder A and to cause such particles to be deposited in bunches on the collecting surface of the cylinder constituting either the outer wall portion of the cylinder or the belt F; the bunched particles being carried upwardly by the magnets. During this picking up action, a jet of water from the nozzle 48 acts to forcibly direct particles upwardly from the upper end portion of the chute D toward the cylinder A thereby facilitating the action of the magnets in effecting attraction thereof. As the attracted particles are carried upward around the cylinder the spray nozzle g in directing jets of water forcibly thereagainst will act to initially remove a portion of such non-magnetic materials as may have been picked up together with the magnetic materials. The materials clinging to the belt or cylinder in the form of bunches or clumps will then be subjected to the successive wiping actions of the brushes d, e and f and the washing sprays directed from the nozzles h, i and j; the brushes acting to scatter the bunched particles so that the jets from the nozzles above the brushes will act to liberate the non-magnetic materials associated with the magnetic particles so that by the time the materials clinging to the belt or cylinder under the action of the magnets reach the upper portion of the cylinder practically all of the non-magnetic materials will be separated from the magnetic materials.

The non-magnetic materials washed out by the nozzles g, h, i, and j will be directed back into the feed trough E and then be carried into the discharge chute D; the materials liberated by the nozzles, h, i and j being directed at least in most part to the downwardly inclined plates 58 which latter are arranged in overhanging relation successively downward so that the materials passing off of the outer ends thereof will be directed into the feed trough E.

By repeatedly subjecting the magnetically attracted materials to the scattering action of the brushes d, e and f and the washing action of the jets from the nozzles g, h, i and j a thorough removal of such non-magnetic particles as may have been picked up with the magnetic materials will be effected, thereby insuring against loss of values in the separated magnetic particles.

Since the larger part of the bulk of black sand consists of magnetic iron, the use of my concentrator in effecting removal of the magnetic iron will greatly reduce the volume and weight of the concentrates carrying the precious metal with the resultant saving in cost of transportation and subsequent treatment of the concentrates in effecting removal of valuable metals therefrom.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a concentrator, a horizontal rotary cylinder, a series of electro-magnets on said cylinder arranged to exert magnetic force inwardly toward the periphery of said cylinder, means for flowing black sand adjacent the lower portion of said cylinder, means for energizing said magnets to attract magnetic materials toward the periphery of said cylinder as the latter revolves, means for effecting removal from the magnetic materials picked up by said magnets of non-magnetic material, said means embodying a series of brushes grouped opposite to a segment of said cylinder and arranged to scatter clumps of magnetically attracted materials while under the influence of said magnets, and nozzles for directing jets of water onto the scattered materials, certain of said nozzles being disposed above and directing their jets toward the brushes of said series and being arranged to wash non-magnetic materials from the magnetic materials while the latter are under the influence of said magnets.

2. In a concentrator, a cylinder mounted to rotate around a horizontal axis, a series of electro-magnets carried by said cylinder, means for directing a flow of black sand along the lower portion of said cylinder in close proximity thereto, and a collecting band on the outer periphery of said cylinder; said magnets being arranged to attract magnetic particles from the black sand and effect deposit thereof on said band while being carried upwardly thereby, brushes for scattering the particles attracted to said band while said particles are being carried upwardly thereby under the influence of said magnets, said brushes being spaced apart circumferentially in relation to said band, and a series of conduits of which individual conduits are located between adjacent brushes and are furnished with nozzle openings positioned to spray water angularly toward said band and in close proximity to the brushes so that the spray will contact the sand while it is being agitated by said brushes under the influence of said magnets.

3. In a concentrator, a cylinder mounted to rotate around a horizontal axis, a series of electro-magnets carried by said cylinder, means for directing a flow of black sand along the lower portion of said cylinder in close proximity thereto, a collecting band on the outer periphery of said cylinder; said magnets being arranged to attract magnetic particles from the black sand and cause them to adhere to said band while being carried upwardly thereby, a series of brushes to act upon the sand while being carried upwardly by the revolution of said cylinder under the influence of said magnets, means to support said brushes in a group adjacent to said cylinder, said supporting means including a group of tiltably adjustable plates which are peripherally spaced apart in relation to said cylinder, water spraying means located between adjacent of said plates to direct streams of water upon the mixture of magnetic and non-magnetic materials simultaneously with their being acted upon by said brushes, and means to convey away the non-magnetic materials by the combined simultaneous action of said brushes and streams of water.

RICHARD M. REEVES.